(12) United States Patent
Azeyanagi et al.

(10) Patent No.: US 8,809,429 B2
(45) Date of Patent: Aug. 19, 2014

(54) AQUEOUS PIGMENT ANTI-SETTLING AGENT AND PROCESS FOR PRODUCING SAME

(75) Inventors: Norifumi Azeyanagi, Soka (JP); Makoto Ubukata, Soka (JP); Tomohisa Ikuta, Soka (JP); Yumiko Kawai, Soka (JP)

(73) Assignee: Kusumoto Chemicals, Ltd., Tokyo (JP)

( * ) Notice: Subject to any disclaimer, the term of this patent is extended or adjusted under 35 U.S.C. 154(b) by 394 days.

(21) Appl. No.: 13/193,811

(22) Filed: Jul. 29, 2011

(65) Prior Publication Data

US 2012/0125235 A1 May 24, 2012

(30) Foreign Application Priority Data

Nov. 24, 2010 (JP) ................................. 2010-261416

(51) Int. Cl.
*C04B 16/00* (2006.01)

(52) U.S. Cl.
USPC .......................................... 524/236; 106/504

(58) Field of Classification Search
USPC ................... 524/198, 236; 106/504
See application file for complete search history.

(56) References Cited

U.S. PATENT DOCUMENTS

| 5,466,734 | A | 11/1995 | Catena et al. | |
|---|---|---|---|---|
| 5,994,494 | A | 11/1999 | Wakui | |
| 2002/0002185 | A1* | 1/2002 | Reed et al. | 514/330 |
| 2008/0145414 | A1* | 6/2008 | Yagi et al. | 424/450 |
| 2008/0249017 | A1* | 10/2008 | Loughrey et al. | 514/12 |
| 2009/0263384 | A1* | 10/2009 | Okada et al. | 424/133.1 |
| 2009/0280094 | A1* | 11/2009 | Matsumoto et al. | 424/93.7 |

FOREIGN PATENT DOCUMENTS

| JP | 56-112977 | 9/1981 |
|---|---|---|
| JP | 2002-146336 | 5/2002 |
| JP | 3564259 | 6/2004 |
| JP | 2005-171155 | 6/2005 |
| JP | 2008-266448 | 11/2008 |

OTHER PUBLICATIONS

Machine translation of JP 2008-266448. Nov. 2008.*
European Search Report issued Mar. 21, 2012 in EP Application No. 11176121.9.

* cited by examiner

*Primary Examiner* — John Uselding
(74) *Attorney, Agent, or Firm* — Wenderoth, Lind & Ponack, L.L.P.

(57) ABSTRACT

The invention provides an aqueous pigment anti-settling agent which, when added to an aqueous coating material, demonstrates excellent pigment anti-settling effect, and in particular, demonstrates excellent pigment anti-settling effect even under a high-temperature environment. This aqueous pigment anti-settling agent is an aqueous dispersion obtained by neutralizing, with a base, a mixture comprising [A] a polyamide obtained by reacting a diamine having 2 to 34 carbon atoms and an excess amount with respect to the diamine of a dicarboxylic acid having 4 to 36 carbon atoms or a mixture of a dicarboxylic acid having 4 to 36 carbon atoms and a monocarboxylic acid having 2 to 22 carbon atoms, [B] an amide wax obtained by reacting a monocarboxylic acid having 2 to 22 carbon atoms and a diamine having 2 to 12 carbon atoms and/or a monoamine having 2 to 22 carbon atoms and/or [C] hydrogenated castor oil, then, dispersing the obtained neutralized product into a medium mainly composed of water, and optionally, heat-treating the obtained dispersion.

3 Claims, No Drawings

AQUEOUS PIGMENT ANTI-SETTLING AGENT AND PROCESS FOR PRODUCING SAME

This application claims the benefit of priority from Japanese Patent Application No. 2010-261416 filed Nov. 24, 2010.

TECHNICAL FIELD

This invention relates to an aqueous pigment anti-settling agent which, when added to an aqueous coating material such as, for instance, aqueous metallic paint, aqueous corrosion-resistant paint and aqueous metallic ink, demonstrates excellent pigment anti-settling effect, and particularly to an aqueous pigment anti-settling agent (hereafter may be abbreviated as aqueous anti-settling agent) that demonstrates excellent pigment anti-settling effect even under a high-temperature environment.

BACKGROUND ART

In recent years, shifting to aqueous systems has been examined actively in coating materials and the like, due to environmental problems, danger of fires and the like, and regarding pigment anti-settling agents, naturally, aqueous ones are also sought. For instance, in solvent-based coating materials, the use of a heat-treated amide wax-based (Patent Document 1) or hydrogenated castor oil-based anti-settling agent (Patent Document 2) is well known for the purpose of preventing settling of pigments. While many of these additives demonstrate excellent pigment anti-settling effects under an ordinary temperature environment and under a high-temperature environment such as at 50° C., they are not fit for an aqueous system due to poor affinity for water.

Meanwhile, a polyamide-based aqueous anti-settling agent containing a polyamide obtained by reacting a primary diamine having specific numbers of carbon atoms and dimer acid (Patent Document 3), an aqueous anti-settling agent containing a polyamide, which is obtained by reacting a diamine with 14 to 40 carbon atoms and a dicarboxylic acid with 2 to 22 carbon atoms, and a polycondensed polyester having a hydroxyl group (Patent Document 4), and an aqueous anti-settling agent containing a polyamide, which is obtained by reacting a diamine with 4 to 40 carbon atoms and a dicarboxylic acid with 4 to 40 carbon atoms, a polyolefin wax and a surfactant (Patent Document 5) are known. However, while polyamide-based aqueous anti-settling agents demonstrate excellent anti-settling effects under ordinary temperature environment, they have the disadvantage that the pigment anti-settling effects are poor under a high-temperature environment such as at 50° C., for instance.

As described above, various aqueous anti-settling agents have been proposed in prior art. However, for instance, aluminum pigments or pearlescent pigments such as mica used in aqueous metallic paints, or corrosion-resistant pigments contained in aqueous corrosion-resistant paints, or the like, have large particle size and large specific gravity as well, such that, regarding these paints, an aqueous anti-settling agent, even if it demonstrates sufficient effects under an ordinary temperature environment, it has problems such as, the effects are insufficient under a high-temperature environment such as at 50° C., which is the heat-resistance temperature required in automotive paint lines, for instance.

PRIOR ART

Patent Documents

[Patent Document 1] Japanese Patent Application Laid-open No. 2002-146336
[Patent Document 2] Japanese Patent Application Laid-open No. Sho 56-112977
[Patent Document 3] Patent Publication No. 3564259
[Patent Document 4] Japanese Patent Application Laid-open No. 2005-171155
[Patent Document 5] Japanese Patent Application Laid-open No. 2008-266448

SUMMARY OF THE INVENTION

Problems to be Solved by the Invention

It is an object of the invention to provide an aqueous anti-settling agent that demonstrates excellent pigment anti-settling effects on, for instance, an aqueous coating material, and particularly an aqueous anti-settling agent that demonstrates excellent pigment anti-settling effects even under a high-temperature environment.

Means to Solve the Problems

As a result of earnest studies to solve the above problems, the present inventors discovered that by combining a polyamide used in an aqueous anti-settling agent, an amide wax and/or hydrogenated castor oil used in solvent based anti-settling agent, precipitation of pigments, which particle size is large and, in addition, which specific gravity is also large, contained in an aqueous coating material such as, for instance, aqueous metallic paints, aqueous corrosion-resistant paints and aqueous metallic inks, could be prevented under an ordinary temperature environment, and in addition, also under a high-temperature environment, and reached completion of the invention.

Thus, according to the invention, provided are a process for producing an aqueous anti-settling agent comprising neutralizing, with a base, a mixture comprising [A] a polyamide obtained by reacting a diamine having 2 to 34 carbon atoms and an excess amount with respect to the diamine of a dicarboxylic acid having 4 to 36 carbon atoms, preferably 6 to 36 carbon atoms, or a mixture of a dicarboxylic acid having 4 to 36 carbon atoms, preferably 6 to 36 carbon atoms, and a monocarboxylic acid having 2 to 22 carbon atoms, preferably 12 to 18 carbon atoms, [B] an amide wax obtained by reacting a monocarboxylic acid having 2 to 22 carbon atoms, preferably 12 to 18 carbon atoms, and a diamine having 2 to 12 carbon atoms, preferably 2 to 8 carbon atoms, and/or a monoamine having 2 to 22 carbon atoms, preferably 2 to 16 carbon atoms, and/or [C] hydrogenated castor oil, then, dispersing the obtained neutralized product into a medium mainly composed of water, and optionally, heat-treating the obtained dispersion, as well as, an aqueous anti-settling agent produced by such a process. That is to say, the invention relates to a process for producing an aqueous anti-settling agent comprising neutralizing, with a base, a mixture comprising a combination of [A] a polyamide and [B] an amide wax, or a mixture comprising a combination of [A] a polyamide and [C] hydrogenated castor oil, or a mixture comprising a combination of [A] a polyamide, [B] an amide wax and

[C] hydrogenated castor oil, then, dispersing the obtained neutralized product into a medium mainly composed of water, and optionally, heat-treating the obtained dispersion, as well as to an aqueous anti-settling agent produced by such a process.

It is desirable for the aqueous anti-settling agent of the invention described above that the weight ratio of [A] the polyamide to [B] the amide wax and/or [C] the hydrogenated castor oil is in the range of 95:5 to 40:60.

In addition, it is desirable for the aqueous anti-settling agent of the invention described above that the acid value of [A] the polyamide is in the range of 30 to 140.

Effects of the Invention

If the aqueous anti-settling agent of the invention is added to an aqueous coating material, then, precipitation of pigments, which particle size is large, and, in addition which specific gravity is also large, can be prevented under an ordinary temperature environment, and in addition under a high-temperature environment such as at 50° C.

MODES FOR CARRYING OUT THE INVENTION

Hereinafter, the invention will be described in detail.
[A] Polyamide

The [A] polyamide used in the aqueous anti-settling agent of the invention (hereinafter referred to as "Component [A]") is a polyamide obtained by reacting a diamine having 2 to 34 carbon atoms and an excess amount with respect to the diamine of a dicarboxylic acid having 4 to 36 carbon atoms, or a mixture of a dicarboxylic acid having 4 to 36 carbon atoms and a monocarboxylic acid having 2 to 22 carbon atoms.

As examples of the diamine having 2 to 34 carbon atoms used in the synthesis of Component [A], ethylene diamine, 1,4-diaminobutane, hexamethylene diamine, metaxylylene diamine, 1,10-decamethylene diamine, 1,11-undecamethylene diamine, 1,12-dodecamethylene diamine, 4,4'-diaminodiphenyl methane, dimer diamine, and the like, can be cited. These may be used alone or may be used in combination.

The dimer diamine used in the synthesis of Component [A] is a dimer acid derivative obtained by chemically reacting the carboxyl groups of the dimer acid, and those (34 carbon atoms) that are commercially available in general can be used.

As examples of the dicarboxylic acid having 4 to 36 carbon atoms used in the synthesis of Component [A], succinic acid, glutaric acid, adipic acid, pimelic acid, suberic acid, azelaic acid, sebacic acid, dodecane diacid, isophthalic acid, dimer acid, and the like, can be cited. These may be used alone or may be used in combination.

The dimer acid used in the synthesis of Component [A] is one obtained by dimerizing an unsaturated fatty acid, and those (36 carbon atoms) that are commercially available in general can be used. While among the commercially available dimer acids, monomer acids and trimer acids are contained in addition to the dimer acid, those with large amounts of dimer acid are desirable.

As examples of the monocarboxylic acid having 2 to 22 carbon atoms used in the synthesis of Component [A], acetic acid, propionic acid, butyric acid, valeric acid, caproic acid, enanthic acid, caprylic acid, pelargonic acid, caprinic acid, lauric acid, myristic acid, palmitic acid, stearic acid, 12-hydroxystearic acid, oleic acid, behenic acid, and the like, can be cited. These may be used alone or may be used in combination.

While the acid value of the Component [A] used in the aqueous anti-settling agent of the invention is not limited in particular, it is preferably in the range of 30 to 140 and more preferably 40 to 100.

[B] Amide Wax

The [B] amide wax used in the aqueous anti-settling agent of the invention (hereinafter referred to "Component [B]") is an amide wax obtained by reacting a monocarboxylic acid having 2 to 22 carbon atoms and a diamine having 2 to 12 carbon atoms and/or a monoamine having 2 to 22 carbon atoms.

As examples of the monocarboxylic acid having 2 to 22 carbon atoms used in the synthesis of Component [B], acetic acid, propionic acid, butyric acid, valeric acid, caproic acid, enanthic acid, caprylic acid, pelargonic acid, caprinic acid, lauric acid, myristic acid, palmitic acid, stearic acid, 12-hydroxystearic acid, oleic acid, behenic acid, and the like, can be cited. These may be used alone or may be used in combination.

As examples of the diamine having 2 to 12 carbon atoms used in the synthesis of Component [B], ethylene diamine, 1,4-diaminobutane, hexamethylene diamine, metaxylylene diamine, 1,10-decamethylene diamine, 1,11-undecamethylene diamine, 1,12-dodecamethylene diamine, and the like, can be cited, and as examples of monoamine having 2 to 22 carbon atoms, ethyl amine, monoethanol amine, propyl amine, butyl amine, pentyl amine, hexyl amine, octyl amine, decyl amine, lauryl amine, myristyl amine, cetyl amine, stearyl amine, behenyl amine, and the like, can be cited. These may be used alone or may be used in combination.

[C] Hydrogenated Castor Oil

The [C] hydrogenated castor oil used in the aqueous anti-settling agent of the invention (hereinafter referred to "Component [C]") is one generated by adding hydrogen to castor oil, and those that are commercially available in general can be used.

While the weight ratio of Component [A] to Component [B] and/or Component [C] (Component [A]:Component [B] and/or Component [C]) in the aqueous anti-settling agent of the invention is not limited in particular, it is preferably in the range of 95:5 to 40:60 and more preferably 80:20 to 45:55.

A modified product of polyolefin wax may be contained in the aqueous anti-settling agent of the invention. As examples thereof, oxidation-modified or acid graft-modified polyolefin waxes, and the like, may be given. These may be used alone or may be used in combination.

In order to facilitate the dispersion of the neutralized product, which has been obtained by neutralizing with a base the mixture of Component [A] and, Component [B] and/or Component [C], into a medium mainly composed of water, a monocarboxylic acid may be contained in the aqueous anti-settling agent of the invention, as necessary. As the monocarboxylic acids to be used, those with 2 to 22 carbon atoms can be used, and as examples of such, acetic acid, propionic acid, butyric acid, valeric acid, caproic acid, enanthic acid, caprylic acid, pelargonic acid, caprinic acid, lauric acid, myristic acid, palmitic acid, stearic acid, 12-hydroxystearic acid, oleic acid, behenic acid, and the like, can be cited. These may be used alone or may be used in combination.

In order to facilitate the dispersion of the neutralized product, which has been obtained by neutralizing with a base the mixture of Component [A] and, Component [B] and/or Component [C], into a medium mainly composed of water, a surfactant may be contained in the aqueous anti-settling agent of the invention, as necessary. As surfactants to be used, although there is no particular limitation, non-ionic surfactants and/or anionic surfactants, and the like, may be cited.

As examples of the above non-ionic surfactant, polyoxyethylene alkyl ether, polyoxyethylene alkylaryl ether, sorbitan fatty acid ester, polyoxyethylene sorbitan fatty acid ester, polyoxyethylene-oxypropylene copolymer, and the like, can be cited. These may be used alone or may be used in combination.

As examples of the above anionic surfactant, alkyl fatty acid salt, alkyl sulfate ester salt, polyoxyethylene alkyl ether sulfate salt, alkylbenzene sulfonic acid salt, sulfosuccinate salt, phosphoric acid ester salt, and the like, can be cited. These may be used alone or may be used in combination.

In order to facilitate the dispersion of the neutralized product, which has been obtained by neutralizing with a base the mixture of Component [A] and, Component [B] and/or Component [C], into a medium mainly composed of water, a organic solvent may be contained in the aqueous anti-settling agent of the invention, as necessary. As organic solvents to be used, while aliphatic hydrocarbons, alicyclic hydrocarbons and aromatic hydrocarbons, or ketones, esters, alcohols, ethers, and the like, can be cited, organic solvents used generally for aqueous coating materials are desirable. As examples of such organic solvents, methyl alcohol, ethyl alcohol, propyl alcohol, butyl alcohol, isobutyl alcohol, isopropyl alcohol, pentyl alcohol, hexyl alcohol, heptyl alcohol, octyl alcohol, 2-ethylhexyl alcohol, ethylene glycol monomethyl ether, diethylene glycol monomethyl ether, triethylene glycol monomethyl ether, ethylene glycol monoisopropyl ether, ethylene glycol monobutyl ether, diethylene glycol monobutyl ether, triethylene glycol monobutyl ether, ethylene glycol monoisobutyl ether, ethylene glycol monohexyl ether, 2-ethylhexyl glycol, propylene glycol monomethyl ether, dipropylene glycol monomethyl ether, propylene glycol monopropyl ether, propylene glycol monobutyl ether, and the like, can be cited. These may be used alone or may be used in combination.

For the base used in the neutralization of the mixture comprising Component [A] and, Component [B] and/or Component [C], and further a modified product of a polyolefin wax and/or a monocarboxylic acid depending on the circumstance, a base used in general as a neutralizing base for instance in aqueous coating materials can be used. As examples of organic substances, alkyl amines such as ethyl amine, diethyl amine and triethylamine and alcohol amines such as ethanolamine, diethanolamine, triethanolamine and N,N-dimethylethanolamine can be cited. As examples of inorganic substances, sodium hydroxide, potassium hydroxide, ammonia, and the like, can be cited. These may be used alone or may be used in combination.

The aqueous anti-settling agent of the invention may contain an additive for the purpose of conferring another function. For instance, when adding to an aqueous coating material, various additives may be added with the purpose of improving gloss retention of the coating film, the dispersibility of the pigment, defoaming ability and vertical plane leveling of the coating material, and the like.

When producing the aqueous anti-settling agent of the invention, first, Component [A] and, Component [B] and/or Component [C], are mixed together with, as optional constituents, a modified product of polyolefin wax, a monocarboxylic acid, a surfactant, an organic solvent, and the like. While the mixing conditions are not limited in particular, since mixing efficiency increases when each component is in a molten state, in general, mixing is carried out at a temperature of 90 to 150° C. Next, a neutralizing base is added to this mixture to neutralize Component [A]. If the mixture contains a modified product of polyolefin wax and/or a monocarboxylic acid, these are also neutralized at the same time as Component [A]. Thereafter, the mixture neutralized above is dispersed while under stirring into a medium mainly composed of water, and optionally, the obtained dispersion is heat-treated, allowing the aqueous anti-settling agent of the invention to be produced.

Methods for reacting a diamine having 2 to 34 carbon atoms and an excess amount with respect to the diamine of a dicarboxylic acid having 4 to 36 carbon atoms, or a mixture of a dicarboxylic acid having 4 to 36 carbon atoms and a monocarboxylic acid having 2 to 22 carbon atoms in order to synthesize the Component [A] in the invention are well known to those of ordinary skill in the art. For instance, it suffices to react a mixture of a diamine and a carboxylic acid at a temperature of 150 to 200° C. for 2 to 10 hours, and in this case, azeotropic solvent such as xylene may be used, as necessary.

Methods for reacting a monocarboxylic acid having 2 to 22 carbon atoms and a diamine having 2 to 12 carbon atoms and/or a monoamine having 2 to 22 carbon atoms in order to synthesize the Component [B] in the invention are well known to those of ordinary skill in the art. For instance, it suffices to react a mixture of a monocarboxylic acid and a diamine and/or a monoamine at a temperature of 150 to 200° C. for 2 to 10 hours, and in this case, azeotropic solvent such as xylene may be used, as necessary.

The amount of base used in the neutralization step can be an amount that is equivalent or greater with respect to the Component [A] in the mixture, or, with respect to the total of the Component [A] and, as optional components, the modified product of polyolefin wax and/or the monocarboxylic acid. This allows the non-water dispersible components in the aqueous anti-settling agent to be suppressed.

The mixture that has been neutralized with the base is dispersed while under stirring into a medium mainly composed of water. While the temperature of the neutralized mixture to be dispersed into the medium is not limited in particular, it is preferably 90 to 150° C. and more preferably 110 to 130° C. At temperature lower than 80° C., the viscosity of the mixture becomes high and handling is difficult, and at temperatures higher than 160° C., it causes foaming at the time of addition into the medium, and production of a stable aqueous anti-settling agent becomes difficult, which is not desirable.

While the temperature of the medium into which the mixture that has been neutralized with the base is to be added is not limited in particular, it is preferably 30 to 80° C. and more preferably 40 to 70° C. At temperatures lower than 25° C., dispersion of the mixture is poor, and at temperatures higher than 99° C., foaming causes the production of a stable aqueous anti-settling agent to be become difficult. In addition, in order to facilitate the dispersion of the neutralized mixture, a surfactant, an organic solvent, and the like, may be added to the medium, as necessary.

When the mixture that has been neutralized with the base is added into the medium, in general, it is immediately dispersed. However, preferably, continuing stirring for on the order of 5 to 30 minutes and then transferring to a vessel and leaving it alone overnight, allows a completely dispersed aqueous anti-settling agent of the invention to be obtained.

In the process for producing the aqueous anti-settling agent of the invention, the dispersion may be optionally heat-treated. Heat-treatment promotes the generation of composite fibrous particles which consist of Component [A] and, Component [B] and/or Component [C], allowing the anti-settling effects to become higher. While the heating temperature when heat-treating the dispersion is not limited in particular, it is preferably 45 to 95° C. and more preferably 50 to 90° C.

While the heat-treatment time for the above-mentioned dispersion is not limited in particular, it is preferably 5 to 60 hours and more preferably 10 to 48 hours.

Aqueous coating materials that are suited for using the aqueous anti-settling agent of the invention are aqueous paints such as aqueous metallic paints and aqueous corrosion-resistant paints containing an aluminum pigment, a pearlescent pigment such as mica, or a corrosion-resistant pigment for which the particle size is large and the specific gravity is also large. However, application is possible elsewhere to general aqueous coating materials or the like, such as aqueous paints and aqueous inks containing a color pigment, an extender pigment, and the like.

The timing for adding the aqueous anti-settling agent of the invention to the aqueous coating material may be the step of grinding the pigment, or, it may be added after the coating material is produced; however, it is also possible to produce a master batch and add. When adding the aqueous anti-settling agent of the invention to the aqueous coating material, it is possible to use a dispersion apparatus generally used in the production of a coating material.

While the amount of the aqueous anti-settling agent of the invention added to the aqueous coating material is different depending on the type and the required capability of the coating material, it is in general, with respect to the entire amount of coating material and calculated based on the active component, in the range of 0.1 to 2.0% by weight, preferably 0.2 to 1.5% by weight and more preferably 0.3 to 1.0% by weight. If the amount added is less than 0.1% by weight, the anti-settling effect is not sufficient, in addition, if an amount greater than 2.0% by weight is used, sometimes detrimental effects such as thickening of the coating material and drop in sharpness occur, which is not desirable.

EXAMPLES

Hereinafter, examples will be given to describe the invention concretely. Note that the invention is not to be limited to these examples in any way. In addition, "%" and "parts" in the examples, unless expressly specified otherwise, indicate "% by weight" and "weight parts".

Polyamide Synthesis Example 1

In a four-neck flask of one liter capacity equipped with a stirrer, a temperature regulator, a water trap and a nitrogen inlet tube, 354 parts (0.60 moles) of dimer acid (product name "Haridimer 250", manufactured by Harima Chemicals, Inc.) and 53.1 parts of xylene (15% of total carboxylic acid) were measured and heated to 50° C. Then, 46.5 parts (0.40 moles) of hexamethylenediamine was added gradually and stirred at 150° C. for 60 minutes. By further heating gently to 175° C., dehydration reaction was carried out for 150 minutes to obtain Polyamide A-1.

Polyamide Synthesis Examples 2 to 9

Synthesis was performed according to the synthesis method of Polyamide Synthesis Example 1 with the compounding ratios of Table 1 to obtain Polyamides A-2 to 9.

TABLE 1

| | | polyamide synthesis example | | | | | | | | |
|---|---|---|---|---|---|---|---|---|---|---|
| | | [A] polyamide | | | | | | | | |
| | | A-1 | A-2 | A-3 | A-4 | A-5 | A-6 | A-7 | A-8 | A-9 |
| Dicarboxylic acid | Dimer acid (mole) | 0.60 | 0.52 | 0.64 | | | 0.60 | 0.60 | 0.60 | 0.60 |
| | Adipic acid (mole) | | | | 1.32 | 0.77 | | | | |
| | Azelaic acid (mole) | | | | | | | 0.15 | | |
| Monocarboxylic acid | 12-hydroxystearic acid (mole) | | | | | | | | | 0.15 |
| | Lauric acid (mole) | | 0.08 | | | | | | | |
| Diamine | Ethylenediamine (mole) | | | | | | 0.40 | | 0.20 | |
| | Hexamethylenediamine (mole) | 0.40 | 0.40 | 0.36 | | | | 0.45 | 0.20 | 0.38 |
| | Dimer diamine (mole) | | | | 0.66 | 0.62 | | | | |
| Acid value | | 63 | 59 | 82 | 139 | 40 | 64 | 68 | 62 | 59 |

Amide Wax Synthesis Example 1

In a four-neck flask of one liter capacity equipped with a stirrer, a temperature regulator, a water trap and a nitrogen inlet tube, 298.6 parts (0.96 moles) of 12-hydroxystearic acid was measured and melted by heating at 80° C. Then, 65.4 parts (0.48 moles) of metaxylylene diamine was added gradually, and dehydration reaction was carried out at 185° C. for 5 hours to obtain the desired Amide Wax B-1.

Amide Wax Synthesis Example 2 to 5

Synthesis was performed according to the synthesis method of Amide Wax Synthesis Example 1 with the compounding ratios of Table 2 to obtain Amide Waxes B-2 to 5.

TABLE 2

| | | amide wax synthesis example | | | | |
|---|---|---|---|---|---|---|
| | | [B] amide wax | | | | |
| | | B-1 | B-2 | B-3 | B-4 | B-5 |
| Carboxylic acid | 12-hydroxystearic acid (mole) | 0.96 | | 0.96 | 0.96 | |
| | Stearic acid (mole) | | 0.96 | | | |
| | Palmitic acid (mole) | | | | | 0.43 |
| | Lauric acid (mole) | | | | | 0.53 |

TABLE 2-continued amide wax synthesis example

|  |  | [B] amide wax | | | | |
|---|---|---|---|---|---|---|
|  |  | B-1 | B-2 | B-3 | B-4 | B-5 |
| Diamine | Metaxylylene diamine (mole) | 0.48 | | | | |
|  | Ethylenediamine (mole) | | 0.48 | | | |
|  | Hexamethylenediamine (mole) | | | | 0.48 | 0.43 |
| Monoamine | Cetylamine (mole) | | | | | 0.10 |
|  | Monoethanolamine (mole) | | | 0.96 | | |

Compounding Examples 1a and 1b

In a four-neck flask of 500 milliliter capacity equipped with a stirrer, a cooling tube and a thermometer, 161.6 parts of distilled water was measured and heated to 40° C. Meanwhile, 16.0 parts of polyamide (A-1) as Component [A], 4.0 parts of amide wax (B-1) as Component [B], 4.0 parts of polyoxyethylene 2-ethylhexyl ether with an HLB of 11.5 (product name "Newcol 1004", manufactured by Nippon Nyukazai Co., Ltd.) as surfactant and 12.0 parts of propylene glycol monomethyl ether as solvent were mixed and dissolved at 120° C. to be turned into liquid form. Thereafter, 2.4 parts of N,N-dimethylethanolamine as neutralizing base was added and mixed.

Next, this mixture in liquid form was added gradually into the above warm water while under stirring. After completion of the addition, in order for the dispersion to be total, the stirring was continued further in a temperature range of 40 to 50° C. for 10 minutes to obtain a dispersion. After completion of the stirring, the dispersion was transferred to a vessel and left alone at room temperature for 24 hours to obtain the heat-untreated Anti-settling Agent 1a. In addition, the dispersion was further heat-treated in a temperature-regulated chamber at 80° C. for 20 hours to obtain the heat-treated Anti-settling Agent 1b.

Compounding Examples 2a, 2b to 8a, 8b

Similar methods to Compounding Examples 1a and 1b were used with the compounding ratios and heat-treatment temperatures of Table-3 to obtain the desired Anti-settling Agents 2a and 2b to 8a and 8b, respectively.

TABLE 3

Compounding Example 1

|  |  |  | Anti-settling agent | | | | | | | | | | | | | | | |
|---|---|---|---|---|---|---|---|---|---|---|---|---|---|---|---|---|---|---|
|  |  |  | 1a | 1b | 2a | 2b | 3a | 3b | 4a | 4b | 5a | 5b | 6a | 6b | 7a | 7b | 8a | 8b |
| Components (parts) | Component [A] | A-1 | 16.0 | | 16.0 | | 16.0 | | 21.0 | | | | | | | | | |
|  |  | A-2 | | | | | | | | | 21.0 | | | | | | | |
|  |  | A-3 | | | | | | | | | | | 8.0 | | 8.0 | | | |
|  |  | A-4 | | | | | | | | | | | | | | | 21.0 | |
|  | Component [B] | B-1 | 4.0 | | | | | | | | | | | | | | | |
|  |  | B-2 | | | 4.0 | | | | | | | | | | | | | |
|  |  | B-3 | | | | | 4.0 | | | | | | | | | | | |
|  |  | B-4 | | | | | | | | | 2.0 | | | | 7.2 | | 4.0 | |
|  |  | B-5 | | | | | | | | | | | 2.0 | | | | | |
|  | Component [C] |  | | | | | | | 7.0 | | 5.0 | | 2.4 | | 9.6 | | 5.0 | |
|  | Surfactant | Newcol 1004 | 40 | | 4.0 | | 4.0 | | | | 3.0 | | 6.7 | | 6.7 | | 5.0 | |
|  | Organic solvent | Propylene glycol monomethyl ether | 12.0 | | 12.0 | | 12.0 | | 10.6 | | 4.0 | | 2.0 | | 2.0 | | | |
|  | Neutralizing base | N,N-dimethyl-ethanolamine | 2.4 | | 2.4 | | 2.4 | | | | 2.6 | | 1.2 | | 1.2 | | 5.9 | |
|  |  | Triethylamine | | | | | | | 2.8 | | | | | | | | | |
|  | Distilled water |  | 161.6 | | 161.6 | | 161.6 | | 156.6 | | 162.4 | | 172.5 | | 172.5 | | 159.1 | |
| Heat-treatment temperature (° C.) | | | — | 80 | — | 80 | — | 80 | — | 75 | — | 90 | — | 50 | — | 90 | — | 80 |
| Active component (%) | | | 10.0 | | 10.0 | | 10.0 | | 15.0 | | 14.0 | | 8.8 | | 8.8 | | 15.0 | |

Compounding Example 9

In a four-neck flask of 500 milliliter capacity equipped with a stirrer, a cooling tube and a thermometer, 162.5 parts of distilled water was measured and heated to 40° C. Meanwhile, 16.0 parts of polyamide (A-5) as Component [A], 4.0 parts of amide wax (B-4) as Component [B], 4.0 parts of polyoxyethylene 2-ethylhexyl ether with an HLB of 11.5 (product name "Newcol 1004", manufactured by Nippon Nyukazai Co., Ltd.) as surfactant and 12.0 parts of propylene glycol monomethyl ether as solvent were mixed and dissolved at 120° C. to be turned into liquid form. Thereafter, 1.5 parts of N,N-dimethylethanolamine as neutralizing base was added and mixed.

Next, this mixture in liquid form was added gradually into the above warm water while under stirring. After completion of the addition, in order for the dispersion to be total, the stirring was continued further in a temperature range of 40 to 50° C. for 10 minutes to obtain a dispersion. After completion of the stirring, the dispersion was transferred to a vessel and heat-treated in a temperature-regulated chamber at 80° C. for 20 hours to obtain the desired heat-treated Anti-settling Agent 9.

Compounding Examples 10 to 14

Similar methods to Compounding Example 9 were used with the compounding ratios, and heat-treatment temperatures of Table-4 to obtain the desired heat-treated Anti-settling Agents 10 to 14, respectively.

Compounding Example 15

In a four-neck flask of 500 milliliter capacity equipped with a stirrer, a cooling tube and a thermometer, 161.0 parts of distilled water was measured and heated to 40° C. Meanwhile, 14.2 parts of polyamide (A-1) as Component [A], 3.6 parts of amide wax (B-4) as Component [B], 2.4 parts of acid-modified polyethylene wax with an acid value of 120 mg KOH/g (product name "A-C 5120", manufactured by Honeywell Japan Inc.), 4.0 parts of polyoxyethylene 2-ethylhexyl ether with an HLB of 11.5 (product name "Newcol 1004", manufactured by Nippon Nyukazai Co., Ltd.) as surfactant and 12.0 parts of propylene glycol monomethyl ether as solvent were mixed and dissolved at 120° C. to be turned into liquid form. Thereafter, 2.8 parts of N,N-dimethylethanolamine as neutralizing base was added and mixed.

Next, this mixture in liquid form was added gradually into the above warm water. After completion of the addition, in order for the dispersion to be total, the stirring was continued further in a temperature range of 40 to 50° C. for 10 minutes to obtain a dispersion. After completion of the stirring, the dispersion was transferred to a vessel and heat-treated in a temperature-regulated chamber at 80° C. for 20 hours to obtain the desired heat-treated Anti-settling Agent 15.

Compounding Example 16

In a four-neck flask of 500 milliliter capacity equipped with a stirrer, a cooling tube and a thermometer, 160.8 parts of distilled water was measured and heated to 40° C. Meanwhile, 14.2 parts of polyamide (A-1) as Component [A], 3.6 parts of amide wax (B-4) as Component [B], 2.4 parts of 12 hydroxystearic acid, 4.0 parts of polyoxyethylene 2-ethylhexyl ether with an HLB of 11.5 (product name "Newcol 1004", manufactured by Nippon Nyukazai Co., Ltd.) as surfactant and 12.0 parts of propylene glycol monomethyl ether as solvent were mixed and dissolved at 120° C. to be turned into liquid form. Thereafter, 3.0 parts of N,N-dimethylethanolamine as neutralizing base was added and mixed.

Next, this mixture in liquid form was added gradually into the above warm water. After completion of the addition, in order for the dispersion to be total, the stirring was continued further in a temperature range of 40 to 50° C. for 10 minutes to obtain a dispersion. After completion of the stirring, the dispersion was transferred to a vessel and heat-treated in a temperature-regulated chamber at 80° C. for 20 hours to obtain the desired heat-treated Anti-settling Agent 16.

TABLE 4

Compounding Example 2

| | | | \multicolumn{8}{c}{Anti-settling agent} |
|---|---|---|---|---|---|---|---|---|---|---|
| | | | 9 | 10 | 11 | 12 | 13 | 14 | 15 | 16 |
| Components (parts) | Component [A] | A-1 | | | | | | 21.0 | 14.2 | 14.2 |
| | | A-5 | 16.0 | | | | | | | |
| | | A-6 | | 16.0 | | | | | | |
| | | A-7 | | | 16.0 | | | | | |
| | | A-8 | | | | 16.0 | | | | |
| | | A-9 | | | | | 16.0 | | | |
| | Component [B] | B-4 | 4.0 | 4.0 | 4.0 | 4.0 | 4.0 | | 3.6 | 3.6 |
| | Component [C] | | | | | | | 9.0 | | |
| | Polyolefin wax | A-C 5120 | | | | | | | 2.4 | |
| | Monocarboxylic acid | 12-hydroxystearic acid | | | | | | | | 2.4 |
| | Surfactant | Newcol 1004 | 4.0 | 4.0 | 4.0 | 4.0 | 4.0 | | 4.0 | 4.0 |
| | Organic solvent | Propylene glycol monomethyl ether | 12.0 | 12.0 | 12.0 | 12.0 | 12.0 | 10.6 | 12.0 | 12.0 |
| | Neutralizing base | N,N-dimethyl-ethanolamine | 1.5 | 2.4 | 2.5 | 2.3 | 2.2 | | 2.8 | 3.0 |
| | | Triethylamine | | | | | | 2.8 | | |
| | Distilled water | | 162.5 | 161.6 | 161.5 | 161.7 | 161.8 | 156.6 | 161.0 | 160.8 |
| Heat-treatment temperature (° C.) | | | 80 | 80 | 80 | 80 | 80 | 75 | 80 | 80 |
| Active component (%) | | | 10.0 | 10.0 | 10.0 | 10.0 | 10.0 | 15.0 | 10.0 | 10.0 |

Compounding Comparative Example 1

In a four-neck flask of 500 milliliter capacity equipped with a stirrer, a cooling tube and a thermometer, 161.0 parts of distilled water was measured and heated to 40° C. Meanwhile, 20.0 parts of polyamide (A-1) as Component [A], 4.0 parts of polyoxyethylene 2-ethylhexyl ether with an HLB of 11.5 (product name "Newcol 1004", manufactured by Nippon Nyukazai Co., Ltd.) as surfactant and 12.0 parts of propylene glycol monomethyl ether as solvent were mixed and dissolved at 120° C. to be turned into liquid form. Thereafter, 3.0 parts of N,N-dimethylethanolamine as neutralizing base was added and mixed.

Next, this mixture in liquid form was added gradually into the above warm water. After completion of the addition, in order for the dispersion to be total, the stirring was continued further in a temperature range of 40 to 50° C. for 10 minutes to obtain a dispersion. After completion of the stirring, the dispersion was transferred to a vessel and left alone at room temperature for 24 hours to obtain the Anti-settling Agent H1 for comparison purpose.

Compounding Comparative Example 2

In a four-neck flask of 500 milliliter capacity equipped with a stirrer, a cooling tube and a thermometer, 162.0 parts of distilled water was measured and heated to 40° C. Meanwhile, 20.0 parts of polyamide (A-5) as Component [A], 4.0 parts of polyoxyethylene 2-ethylhexyl ether with an HLB of 11.5 (product name "Newcol 1004", manufactured by Nippon Nyukazai Co., Ltd.) as surfactant and 12.0 parts of propylene glycol monomethyl ether as solvent were added, mixed and dissolved at 120° C. to be turned into liquid form. Thereafter, 2.0 parts of N,N-dimethylethanolamine as neutralizing base was added and mixed.

Next, this mixture in liquid form was added gradually into the above warm water. After completion of the addition, in order for the dispersion to be total, the stirring was continued further in a temperature range of 40 to 50° C. for 10 minutes to obtain a dispersion. After completion of the stirring, the dispersion was transferred to a vessel and left alone at room temperature for 24 hours to obtain the Anti-settling Agent H2 for comparison purpose.

Compounding Comparative Example 3

In a four-neck flask of 500 milliliter capacity equipped with a stirrer, a cooling tube and a thermometer, 165.4 parts of distilled water was measured and heated to 40° C. Meanwhile 16.0 parts of polyamide (A-5) as Component [A], 4.0 parts of acid-modified polyethylene wax with an acid value of 120 mg KOH/g (product name "A-C 5120", manufactured by Honeywell Japan Inc.), 4.0 parts of polyoxyethylene 2-ethylhexyl ether with an HLB of 11.5 (product name "Newcol 1004", manufactured by Nippon Nyukazai Co., Ltd.) as surfactant and 12.0 parts of propylene glycol monomethyl ether as solvent were mixed and dissolved at 120° C. to be turned into liquid form. Thereafter, 2.0 parts of N,N-dimethylethanolamine as neutralizing base was added and mixed.

Next, this mixture in liquid form was added gradually into the above warm water. After completion of the addition, in order for the dispersion to be total, the stirring was continued further in a temperature range of 40 to 50° C. for 10 minutes to obtain a dispersion. After completion of the stirring, the dispersion was transferred to a vessel and left alone at room temperature for 24 hours to obtain the Anti-settling Agent H3 for comparison purpose.

Compounding Comparative Example 4

In a four-neck flask of 500 milliliter capacity equipped with a stirrer, a cooling tube and a thermometer, 164.0 parts of distilled water was measured and heated to 40° C. Meanwhile, 20.0 parts of amide wax (B-4) as Component [B], 4.0 parts of polyoxyethylene 2-ethylhexyl ether with an HLB of 11.5 (product name "Newcol 1004", manufactured by Nippon Nyukazai Co., Ltd.) as surfactant and 12.0 parts of propylene glycol monomethyl ether as solvent were mixed and dissolved at 120° C. to be turned into liquid form.

Next, this mixture was gradually added into the above warm water; however, since aggregates and precipitates were generated in the dispersion, the production of this aqueous anti-settling agent for comparison purpose was aborted.

Compounding Comparative Example 5

In a four-neck flask of 500 milliliter capacity equipped with a stirrer, a cooling tube and a thermometer, 164.0 parts of distilled water was measured and heated to 40° C. Meanwhile, 20.0 parts of hydrogenated castor oil as Component [C], 4.0 parts of polyoxyethylene 2-ethylhexyl ether with an HLB of 11.5 (product name "Newcol 1004", manufactured by Nippon Nyukazai Co., Ltd.) as surfactant and 12.0 parts of propylene glycol monomethyl ether as solvent were mixed and dissolved at 120° C. to be turned into liquid form.

Next, this mixture was gradually added into the above warm water; however, since aggregates and precipitates were generated in the dispersion, the production of this aqueous anti-settling agent for comparison purpose was aborted.

Compounding Comparative Example 6

In a four-neck flask of 500 milliliter capacity equipped with a stirrer, a cooling tube and a thermometer, 158.2 parts of distilled water was measured and heated to 40° C. Meanwhile, 20.0 parts of acid-modified polyethylene wax with an acid value of 120 mg KOH/g (product name "A-C 5120", manufactured by Honeywell Japan Inc.), 4.0 parts of polyoxyethylene 2-ethylhexyl ether with an HLB of 11.5 (product name "Newcol 1004", manufactured by Nippon Nyukazai Co., Ltd.) as surfactant and 12.0 parts of propylene glycol monomethyl ether as solvent were mixed and dissolved at 120° C. to be turned into liquid form. Thereafter, 5.8 parts of N,N-dimethylethanolamine as neutralizing base was added and mixed.

Next, this mixture in liquid form was added gradually into the above warm water. After completion of the addition, in order for the dispersion to be total, the stirring was continued further in a temperature range of 40 to 50° C. for 10 minutes to obtain a dispersion. After completion of the stirring, the dispersion was transferred to a vessel and left alone at room temperature for 24 hours to obtain the Anti-settling Agent H6 for comparison purpose.

Compounding Comparative Example 7

In a four-neck flask of 500 milliliter capacity equipped with a stirrer, a cooling tube and a thermometer, 161.8 parts of distilled water was measured and heated to 40° C. Meanwhile, 12.0 parts of amide wax (B-4) as Component [B], 8.0 parts of acid-modified polyethylene wax with an acid value of 120 mg KOH/g (product name "A-C 5120", manufactured by Honeywell Japan Inc.), 4.0 parts of polyoxyethylene 2-ethylhexyl ether with an HLB of 11.5 (product name "Newcol 1004", manufactured by Nippon Nyukazai Co., Ltd.) as surfactant and 12.0 parts of propylene glycol monomethyl ether as solvent were mixed and dissolved at 120° C. to be turned into liquid form. Thereafter, 2.2 parts of N,N-dimethylethanolamine as neutralizing base was added and mixed.

Next, this mixture was gradually added into the above warm water; however, since aggregates and precipitates were generated in the dispersion, the production of this aqueous anti-settling agent for comparison purpose was aborted.

Compounding Comparative Example 8

In a four-neck flask of 500 milliliter capacity equipped with a stirrer, a cooling tube and a thermometer, 160.6 parts of distilled water was measured and heated to 40° C. Meanwhile, 12.0 parts of amide wax (B-4) as Component [B], 8.0 parts of 12-hydroxystearic acid, 4.0 parts of polyoxyethylene 2-ethylhexyl ether with an HLB of 11.5 (product name "Newcol 1004", manufactured by Nippon Nyukazai Co., Ltd.) as surfactant and 12.0 parts of propylene glycol monomethyl ether as solvent were mixed and dissolved at 120° C. to be turned into liquid form. Thereafter, 3.4 parts of N,N-dimethyl-ethanolamine as neutralizing base was added and mixed.

Next, this mixture was gradually added into the above warm water; however, since aggregates and precipitates were generated in the dispersion, the production of this aqueous anti-settling agent for comparison purpose was aborted.

TABLE 5

Compounding Comparative Example

| | | | \multicolumn{8}{c}{Anti-settling agent} | | | | | | | |
|---|---|---|---|---|---|---|---|---|---|---|

| | | | H1 | H2 | H3 | H4 | H5 | H6 | H7 | H8 |
|---|---|---|---|---|---|---|---|---|---|---|
| Components (parts) | Component [A] | A-1 | 20.0 | | | | | | | |
| | | A-5 | | 20.0 | 16.0 | | | | | |
| | Component [B] | B-4 | | | | 20.0 | | | 12.0 | 12.0 |
| | Component [C] | | | | | | 20.0 | | | |
| | Polyolefin wax | A-C 5120 | | | 4.0 | | | 20.0 | 8.0 | |
| | Monocarboxylic acid | 12-hydroxystearic acid | | | | | | | | 8.0 |
| | Surfactant | Newcol 1004 | 4.0 | 4.0 | 4.0 | 4.0 | 4.0 | 4.0 | 4.0 | 4.0 |
| | Organic solvent | Propylene glycol monomethyl ether | 12.0 | 12.0 | 12.0 | 12.0 | 12.0 | 12.0 | 12.0 | 12.0 |
| | Neutralizing base | N,N-dimethyl-ethanolamine | 3.0 | 2.0 | 2.0 | | | 5.8 | 2.2 | 3.4 |
| | Distilled water | | 161.0 | 162.0 | 165.4 | 164.0 | 164.0 | 158.2 | 161.8 | 160.6 |
| Active component (%) | | | 10.0 | 10.0 | 10.0 | | | 10.0 | | |
| Remarks | | | | | | * | * | | * | * |

* Due to aggregation and precipitation, production of the anti-settling agent was aborted.

Test Example 1

Performance tests of the aqueous anti-settling agents were carried out using the aqueous acrylic emulsion paint of the formulation (weight parts) indicated in Table-6.

Preparation of aqueous acrylic emulsion paint: NeoCryl A-662, distilled water and each organic solvent were mixed by stirring and then the pH was adjusted to 8.0 using N,N-dimethyl-ethanolamine to prepare a clear paint. To this, the metallic pigment Iriodin 504 Red and 0.6% in weight (calculated based on the active component) of aqueous anti-settling agent were added and dispersed with a cowles dissolver (2000 rpm×10 minutes).

Viscosity and TI value: using a B-type viscometer, the viscosity (mPa·s) at 60 rpm and the viscosity (mPa·s) at 6 rpm were measured at 25° C. and the ratio thereof (viscosity at 6 rpm/viscosity at 60 rpm) was calculated. The larger the value of the ratio (TI value) is, the larger the thixotropy is.

Anti-settling properties: paint was diluted with distilled water so that the viscosity measured using a Ford cup #4 was 25 seconds (25° C.) and this diluted paint was transferred into two of 100 ml glass bottles. Thereafter, these were left alone in a temperature-regulated chamber at 25° C. and 50° C. for seven days, and the percentage of the volume of the Iriodin which settled to the volume of the entire amount of paint was measured.

The test results are shown in Table-7. It is understood that when the aqueous anti-settling agent of the invention is added to the aqueous metallic paint, an excellent effect in the prevention of the settling of the pigment is exerted, in particular at 50° C.

TABLE 6

Formulation of aqueous acrylic emulsion paint

| Raw material name | Weight (parts) | Raw material company name |
|---|---|---|
| NeoCryl A-662 | 172.3 | DSM NeoResins |
| Distilled water | 8.0 | |
| Ethylene glycol monobutyl ether | 20.3 | Kyoei Chemical Co., Ltd. |
| Diethylene glycol monobutyl ether | 20.3 | Nippon Nyukazai Co., Ltd. |
| Dipropylene glycol monomethyl ether | 20.3 | Nippon Nyukazai Co., Ltd |
| N,N-dimethylethanolamine | 0.2 | Nippon Nyukazai Co., Ltd. |
| Iriodin 504 Red | 8.6 | Merck Japan |

TABLE 7

Test results with aqueous acrylic emulsion paint

| | | | Before dilution 60 rpm | | Anti-settling properties (%) | |
|---|---|---|---|---|---|---|
| Sample name | | | viscosity (mPa·S) | TI value | 25° C. × 7 days | 50° C. × 7 days |
| Blank | | | 15 | 0.83 | 1.7 | 1.7 |
| Compounding Example 1 | Anti-settling agent | 1a | 370 | 4.53 | 98.2 | 14.5 |
| | | 1b | 189 | 4.98 | 96.6 | 72.4 |
| | | 2a | 330 | 4.42 | 98.2 | 78.2 |
| | | 2b | 587 | 4.80 | 87.9 | 60.3 |
| | | 3a | 452 | 3.80 | 98.2 | 56.4 |
| | | 3b | 145 | 2.95 | 77.6 | 86.2 |
| | | 4a | 340 | 4.15 | 100.0 | 41.8 |
| | | 4b | 235 | 2.70 | 96.6 | 69.0 |
| | | 5a | 285 | 3.42 | 60.3 | 84.5 |
| | | 5b | 259 | 3.22 | 86.2 | 81.0 |
| | | 6a | 61 | 1.96 | 72.7 | 35.7 |
| | | 6b | 64 | 2.39 | 87.3 | 27.3 |
| | | 7a | 77 | 2.35 | 89.1 | 78.6 |
| | | 7b | 65 | 2.08 | 83.6 | 61.4 |
| | | 8a | 134 | 4.00 | 98.1 | 81.8 |
| | | 8b | 83 | 3.09 | 100.0 | 27.3 |
| Compounding Comparative Example | Anti-settling agent | H1 | 270 | 3.49 | 94.8 | 3.4 |
| | | H2 | 279 | 4.76 | 77.6 | 6.9 |
| | | H3 | 225 | 3.82 | 81.0 | 1.7 |
| | | H6 | 21 | 0.93 | 3.4 | 1.7 |

Test Example 2

Performance tests of the aqueous anti-settling agents were carried out using the aqueous urethane dispersion paint of the formulation (weight parts) indicated in Table-8.

Preparation of aqueous urethane dispersion paint: Composition A of Table-8 was dispersed uniformly to prepare a mill base. Next, the mill base was mixed into the NeoRez R-966 of Composition B by stirring to prepare an aqueous urethane dispersion paint. To this, 0.6% in weight (calculated based on the active component) of aqueous anti-settling agent was added and dispersed using a cowles dissolver (2000 rpm×10 minutes).

Viscosity and TI value: using a B-type viscometer, the viscosity (mPa·s) at 60 rpm and the viscosity (mPa·s) at 6 rpm were measured at 25° C. and the ratio thereof (viscosity at 6 rpm/viscosity at 60 rpm) was calculated. The larger the value of the ratio (TI value) is, the larger the thixotropy is.

Anti-settling properties: paint was diluted with distilled water so that the viscosity measured using a Ford cup #4 was 25 seconds (25° C.) and this diluted paint was transferred into two of 100 ml glass bottles. Thereafter, these were left alone in a temperature-regulated chamber at 25° C. and 50° C. for seven days, and the percentage of the volume of the aluminum which settled to the volume of the entire amount of paint was measured.

The test results are shown in Table-9. It is understood that when the aqueous anti-settling agent of the invention is added to the aqueous metallic paint, an excellent effect in the prevention of the settling of the pigment is exerted, in particular at 50° C.

TABLE 8

Formulation of urethane dispersion paint

| Raw material name | Weight (parts) | Raw material company name |
|---|---|---|
| Composition A | | |
| NeoRez R-966 | 50.0 | DSM NeoResins |
| ALPASTE WXM7640 | 12.9 | Toyo Aluminium K.K. |
| DISPARLON AQ-320 | 1.1 | Kusumoto Chemicals, Ltd. |
| Composition B | | |
| NeoRez R-966 | 207.6 | DSM NeoResins |

TABLE 9

Test results with aqueous urethane dispersion paint

| Sample name | | | Before dilution 60 rpm viscosity (mPa·S) | TI value | Anti-settling properties (%) 25° C. × 7 days | 50° C. × 7 days |
|---|---|---|---|---|---|---|
| Blank | | | 15 | 0.85 | 5.2 | 5.2 |
| Compounding Example 2 | Anti-settling agent | 9 | 333 | 3.95 | 100.0 | 94.8 |
| | | 10 | 189 | 4.98 | 96.6 | 72.4 |
| | | 11 | 395 | 3.30 | 100.0 | 100.0 |
| | | 12 | 364 | 4.47 | 100.0 | 91.4 |
| | | 13 | 1021 | 4.56 | 93.1 | 91.4 |
| | | 14 | 155 | 2.12 | 74.1 | 45.0 |
| | | 15 | 605 | 4.68 | 89.7 | 86.2 |
| | | 16 | 580 | 4.29 | 94.8 | 86.2 |
| Compounding Comparative Example | Anti-settling agent | H1 | 514 | 3.25 | 100.0 | 6.9 |
| | | H2 | 18 | 0.43 | 5.2 | 3.4 |
| | | H3 | 24 | 0.65 | 6.9 | 6.9 |
| | | H6 | 15 | 0.51 | 6.9 | 8.6 |

Test Example 3

Performance tests of the aqueous anti-settling agents were carried out using the aqueous ink of the formulation (weight parts) indicated in Table-10.
Preparation of aqueous ink: Joncryl 7100 and distilled water were mixed by stirring, then, the metallic pigment Iriodin 504 Red and 0.6% in weight (calculated based on the active component) of aqueous anti-settling agent were added and dispersed with a cowles dissolver (2000 rpm×10 minutes).

Viscosity and TI value: using a B-type viscometer, the viscosity (mPa·s) at 60 rpm and the viscosity (mPa·s) at 6 rpm were measured at 25° C. and the ratio thereof (viscosity at 6 rpm/viscosity at 60 rpm) was calculated. The larger the value of the ratio (TI value) is, the larger the thixotropy is.

Anti-settling properties: ink was diluted with distilled water so that the viscosity at 60 rpm measured using a B-type viscometer at 25° C. was 70 mPa·S, and this diluted ink was transferred into two of 100 ml glass bottles. Thereafter, these were left alone in a temperature-regulated chamber at 25° C. and 50° C. for seven days, and the percentage of the volume of the Iriodin which settled to the volume of the entire amount of ink was measured.

The test results are shown in Table-11. It is understood that when the aqueous anti-settling agent of the invention is added to the aqueous ink, an excellent effect in the prevention of the settling of the pigment is exerted, in particular at 50° C.

TABLE 10

Formulation of aqueous ink

| Raw material name | Weight (parts) | Raw material company name |
|---|---|---|
| Joncryl 7100 | 215.6 | BASF Japan |
| Distilled water | 23.9 | |
| Iriodin 504 Red | 10.4 | Merck Japan |

TABLE 11

Test results with aqueous ink

| Sample name | | | Before dilution 60 rpm viscosity (mPa·S) | TI value | Anti-settling properties (%) 25° C. × 7 days | 50° C. × 7 days |
|---|---|---|---|---|---|---|
| Blank | | | 92 | 1.39 | 4.8 | 11.4 |
| Compounding Example 2 | Anti-settling agent | 9 | 123 | 3.52 | 90.9 | 84.1 |
| | | 10 | 141 | 2.48 | 86.4 | 43.2 |
| | | 11 | 241 | 2.89 | 95.5 | 86.4 |
| | | 12 | 153 | 2.96 | 88.6 | 45.5 |
| | | 13 | 142 | 3.18 | 97.7 | 68.2 |
| | | 14 | 99 | 1.89 | 93.2 | 84.1 |
| | | 15 | 235 | 3.26 | 79.5 | 50.0 |
| | | 16 | 319 | 3.80 | 93.2 | 56.8 |
| Compounding Comparative Example | Anti-settling agent | H1 | 105 | 1.85 | 65.9 | 34.1 |
| | | H2 | 60 | 1.34 | 11.6 | 15.9 |
| | | H3 | 170 | 1.90 | 77.3 | 40.9 |
| | | H6 | 73 | 1.58 | 22.7 | 20.5 |

The invention claimed is:
1. A process for producing an aqueous pigment anti-settling agent consisting of:
mixing [A] and at least one of [B] or [C],
wherein [A] is a polyamide obtained by reacting a diamine having 2 to 34 carbon atoms and an excess amount with respect to the diamine of a dicarboxylic acid having 4 to 36 carbon atoms or a mixture of a dicarboxylic acid having 4 to 36 carbon atoms and a monocarboxylic acid having 2 to 22 carbon atoms,
wherein [B] is an amide wax obtained by reacting a monocarboxylic acid having 2 to 22 carbon atoms and a diamine having 2 to 12 carbon atoms and/or a monoamine having 2 to 22 carbon atoms and,
wherein [C] is hydrogenated castor oil which is generated by adding hydrogen to castor oil;
neutralizing the obtained mixture with a base;
then, dispersing the obtained neutralized product into a medium mainly composed of water; and
optionally, heat-treating the obtained dispersion.
2. The process for producing an aqueous pigment anti-settling agent according to claim 1, wherein [A] and at least one of [B] or [C] are mixed with a weight ratio in the range of 95:5 to 40:60.

3. The process for producing an aqueous pigment anti-settling agent according to claim 1, wherein an acid value of [A] the polyamide is in the range of 30 to 140 mg KOH/g.

\* \* \* \* \*